United States Patent
Schmed

Patent Number: 5,753,297
Date of Patent: May 19, 1998

[54] METHOD AND DEVICE FOR PREPARING A BEVERAGE SUCH AS ESPRESSO COFFEE

[75] Inventor: Arthur-Joachim Schmed, Oberdürnten, Switzerland

[73] Assignee: J. Lough Limited, Dublin, Ireland

[21] Appl. No.: 885,344

[22] Filed: Jun. 30, 1997

Related U.S. Application Data

[63] Continuation of Ser. No. 595,912, Feb. 6, 1996, abandoned.

[30] Foreign Application Priority Data

Feb. 8, 1995 [CH] Switzerland .................... 354/95

[51] Int. Cl.⁶ .................................................. A23F 5/24
[52] U.S. Cl. ...................................... 426/595; 426/433
[58] Field of Search ................................ 426/595, 433

[56] References Cited

U.S. PATENT DOCUMENTS

| | | |
|---|---|---|
| 2,601,067 | 6/1952 | Spencer. |
| 3,288,049 | 11/1966 | Schmidt et al. |
| 4,633,771 | 1/1987 | Anderl. |
| 5,134,925 | 8/1992 | Bunn et al. |

FOREIGN PATENT DOCUMENTS

| | | |
|---|---|---|
| 0555775 | 8/1993 | European Pat. Off. |
| 0622039 | 11/1994 | European Pat. Off. |
| 2231341 | 12/1974 | France. |
| 3035157 | 4/1982 | Germany. |
| 3909738 | 2/1990 | Germany. |

*Primary Examiner*—Anthony J. Weier
*Attorney, Agent, or Firm*—Rockey, Milnamow & Katz, Ltd.

[57] ABSTRACT

The present invention relates to a method for preparing a beverage such as espresso coffee, which consists in feeding pressurized hot water through a coffee powder tablet; blocking, downstream of the tablet, the extracted liquid that has passed through the tablet; producing a removable plug by the use of the extracted liquid; causing an increase in pressure downstream of the tablet to increase the hot water pressurization inside the tablet; and reaching a removal pressure adapted to remove the removable plug, with subsequent dispensing of the extracted liquid at a dispensing pressure that is lower than the removal pressure to cause a decompression of the hot water inside the tablet.

8 Claims, 2 Drawing Sheets

METHOD AND DEVICE FOR PREPARING A BEVERAGE SUCH AS ESPRESSO COFFEE

This is a continuation of application Ser. No. 08/595.912. filed Feb. 6, 1996 now abandoned.

BACKGROUND OF THE INVENTION

The present invention relates to a method and device preparing a beverage such as espresso coffee.

In the production of beverages such as espresso coffee, pressurized hot water is usually fed through a tablet of coffee powder, so that the water penetrates in the interstices between the granules to imbibe the coffee granules. If the dispensing pressure of the espresso coffee is equal to the atmospheric pressure, a pressure capable of overcoming the resistance of the tablet to the passage of water is generated automatically inside the tablet of coffee powder; the value of this pressure decreases from the uppermost layer of the tablet towards the lowermost layer, with consequent non-uniform imbibing of the various coffee granules and their insufficient utilization.

Systems are also known for dispensing espresso coffee at a higher pressure than atmospheric pressure, by providing a stopper valve or cock that in practice produces a counter-pressure at the dispensing outlet.

In this manner it is possible to better utilize the coffee powder tablet, the granules whereof become deeply imbibed with water over the entire thickness of the tablet.

Systems ensuring a constant flow-rate are also known, but in this case too the solution has been found far from being optimal.

In both of the above mentioned solutions, it has been observed that the coffee powder is not fully utilized in terms of its total content of precious principles.

SUMMARY OF THE INVENTION

A principal aim of the invention is indeed to solve the above described problem by providing a method for preparing a beverage such as espresso coffee and a device for performing said method, which allow to produce, between the coffee granules, conditions that facilitate the complete imbibing of the various granules with water, with subsequent extraction of all the precious principles contained in said granules.

Within the scope of this aim, a particular object of the invention is to provide a device that allows to automatically perform a plurality of operating steps that provide optimum utilization of the coffee powder tablet.

Another object of the present invention is to provide a device for preparing a beverage such as espresso coffee that despite being structurally simple is capable of giving the greatest assurances of reliability and safety in use.

Another object of the present invention is to provide a device which can be easily obtained starting from commonly commercially available elements and materials and which is furthermore competitive from a purely economical point of view.

This aim, these objects, and others which will become apparent hereinafter are achieved by a method for preparing a beverage such as espresso coffee, characterized in that it consists in: feeding pressurized hot water through a coffee powder tablet; blocking, downstream of said tablet, the extracted liquid that has passed through said tablet; producing a removable plug by means of said extracted liquid; causing an increase in pressure downstream of said tablet to increase the hot water pressurization inside said tablet; and reaching a removal pressure adapted to remove said removable plug, with subsequent dispensing of the extracted liquid at a dispensing pressure that is lower than said removal pressure to cause a depressurization of the hot water inside said tablet.

BRIEF DESCRIPTION OF THE DRAWINGS

Further characteristics and advantages will become apparent from the following detailed description of a preferred but not exclusive embodiment of a method for preparing a beverage such as espresso coffee and of the corresponding device for performing it, both whereof are illustrated only by way of non-limitative example in the accompanying drawings, wherein.

DESCRIPTION OF THE PREFERRED EMBODIMENTS

Figure 1:
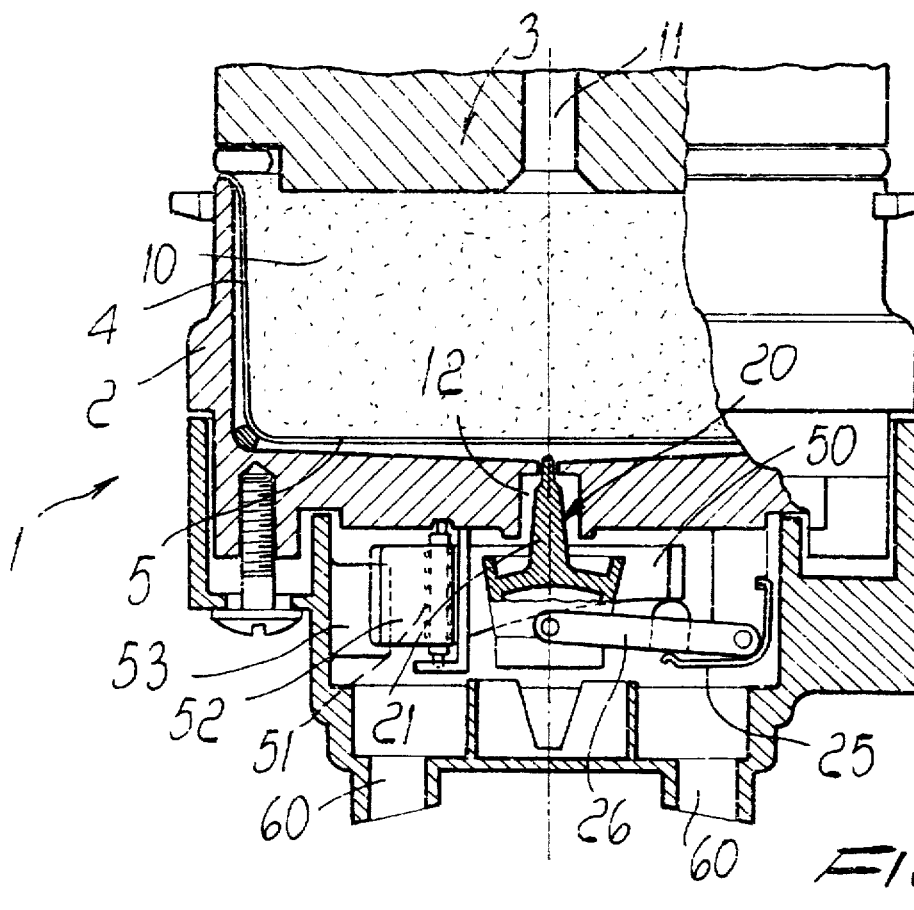
FIG. 1 is a sectional view of the device for preparing an espresso coffee, according to the invention, during the initial step for forming the removable plug.

With reference to the above figures, the device for preparing a beverage such as espresso coffee, generally designated by the reference numeral 1, comprises a body 2 which, in a per se known manner, can be coupled to a unit 3 for feeding pressurized hot water.

The body 2 internally supports a filter container 4, provided with a perforated bottom 5, inside which it is possible to insert a tablet or pellet 10 of coffee powder, which is interposed between the hot water inlet duct 11, formed by the water feed unit 3, and a dispensing duct that is generally designated by the reference numeral 12 and is formed on the bottom of the body 2.

A stopper valve 20 is provided at the dispensing duct 12 and is constituted by a stopper 21 that acts on a stopper seat 22.

The stopper 21 is movable towards and away from the seat 22, so as to produce the opening and closure of said seat.

The seat 22 is formed at the bottom of the body 2 and has a shoulder 23, inside which a hole 24 is provided; said shoulder and said hole are blended together by means of a tight blending radius.

The stopper 21 ends with a stem 30 that has a conical shape and is long and narrow, i.e., it has a small apex angle, and merges with the stopper 21 by means of an abutment surface 31 which is frustum-shaped in the mentioned example but can assume in practice any configuration deemed appropriate.

The stopper 21 abuts against the seat 22, and more precisely against the shoulder 23 of the seat, by means of the abutment surface 31, whereas the conical stem 30 engages inside the hole 24, forming a gap 40 that is small when the stopper abuts against the seat 12 and increases as the stopper 21 moves away from the seat 22.

Figure 2:
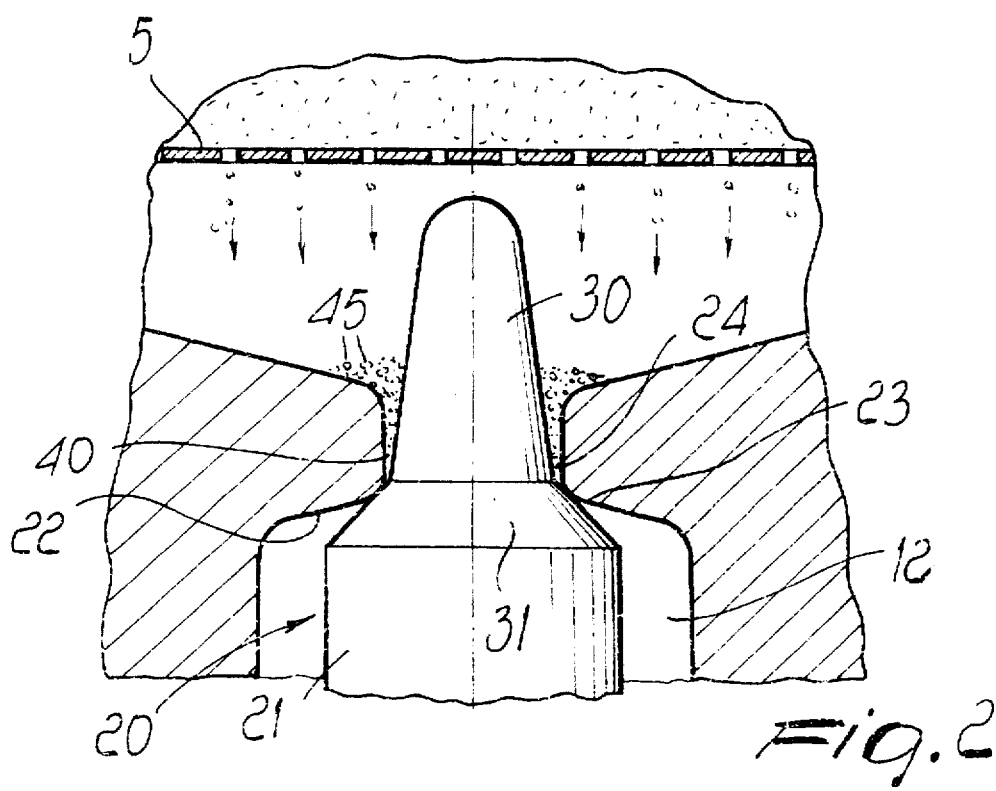
FIG. 2 is an enlarged-scale view of the detail of the tip of the stem of the stopper in the position shown in FIG. 1.
Figure 3:
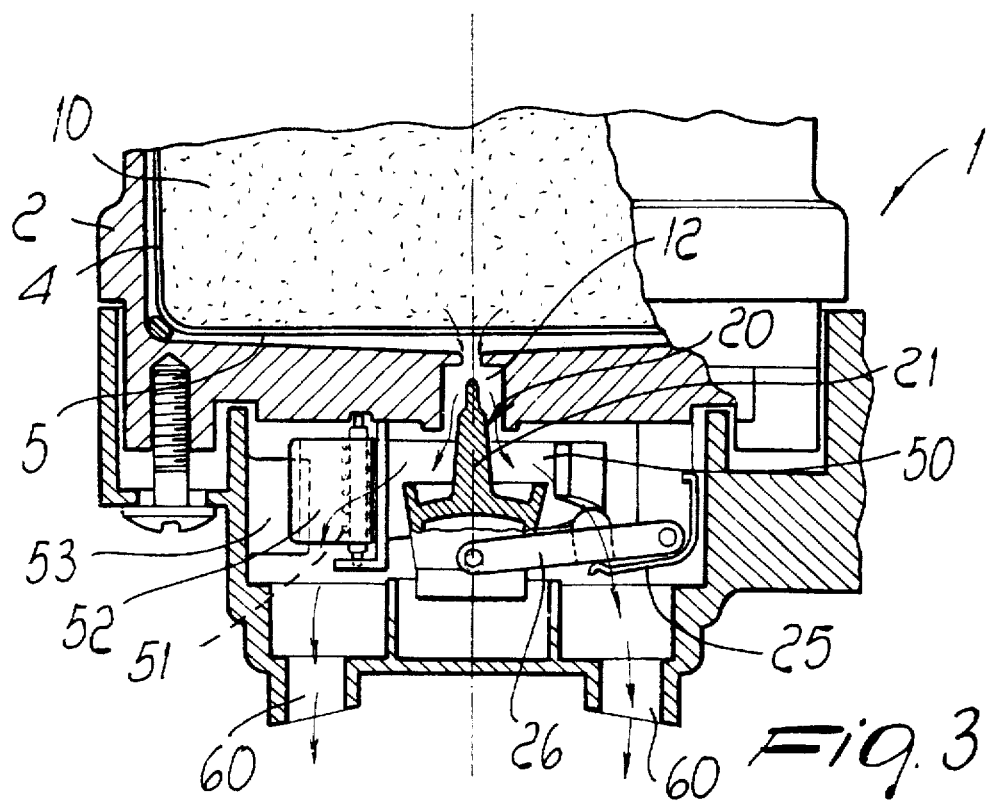
FIG. 3 is a sectional view of the device during the dispensing step.
Figure 4:
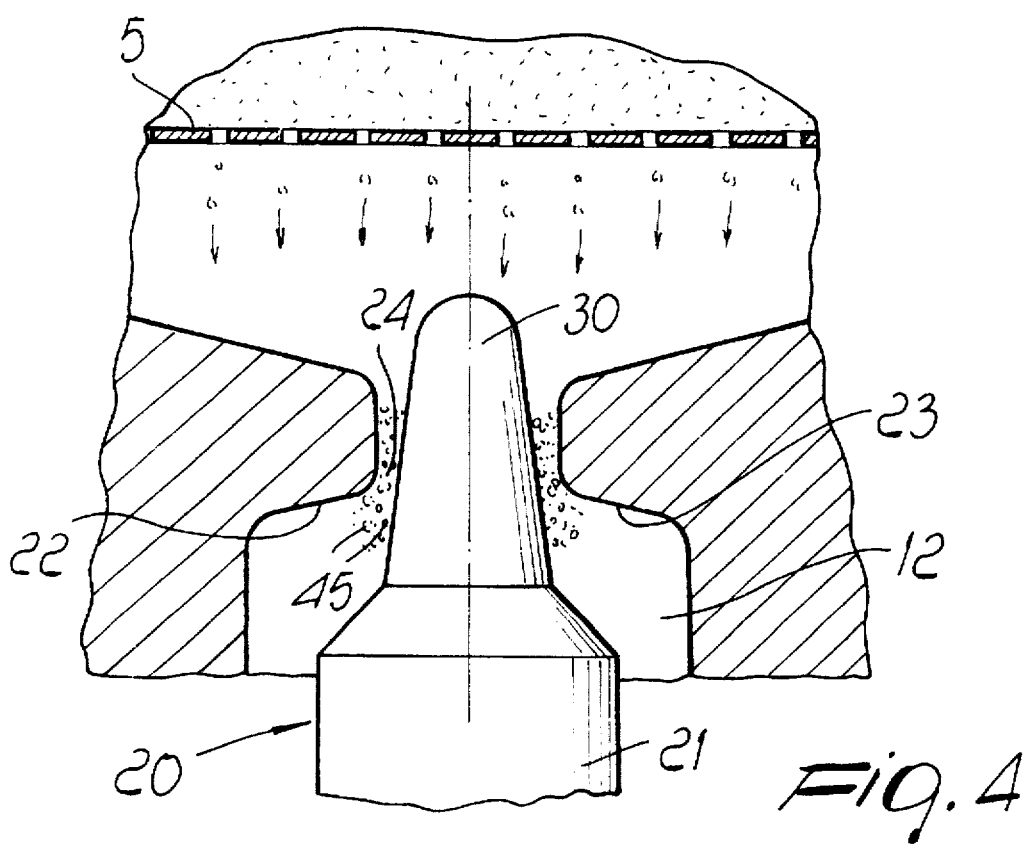
FIG. 4 is an enlarged-scale view of the tip of the stem of the stopper during the dispensing step.

When the gap 40 is smallest, i.e., when the stopper is in closed position, it has the purpose of preventing the passage, through the stopper, of the first portion of extracted liquid that has passed through the coffee tablet and contains solid particles, schematically designated by the reference numeral 45 in FIG. 2, which have been released by the coffee powder 10 and have passed through the perforated bottom 5.

The taper angle of the stem 30, as mentioned earlier, has a sufficiently small value, so as to require a stroke having a preset large value on the part of the stopper away from the seat before the gap 40 assumes a size that allows the passage of the solid particles 45, which in practice have formed a removable plug.

The stopper valve 20 furthermore comprises elastic means, constituted by a folded elastic lamina 25, which act on a linkage 26 pivoted between an internal point of the body 2 and said stopper.

The setting of the elastic means is such that the stopper is kept engaged against the seat of the stopper up to a certain pressure level, for example five atmospheres, whereas to achieve the initial dispensing of the coffee it is necessary to reach a removal pressure, for example of ten atmospheres, to push the stopper to the end of the stroke that allows the passage of the solid particles, i.e., of the removable plug, through the open stopper valve.

After removing the removable plug, which in practice has produced an increase in pressure, downstream of the coffee tablet, which substantially produces a counterpressure that increases the pressurization of the hot water inside the tablet, when the removable plug is removed, the resulting dispensing pressure of the extracted liquid is lower than the removal pressure, so that depressurization of the hot water inside the tablet occurs, with subsequent complete extraction of the precious principles that are present inside the coffee.

In order to keep the stopper 21 in the maximum spacing position that it reaches to remove the removable plug, it is possible to provide a cam-shaped wedge, designated by the reference numeral 50, that is oscillatably mounted about an axis that is substantially parallel to the axis of the translatory motion of the stopper 21 and is pushed by a weak spring 51.

The cam-shaped wedge 50 is substantially semicircular and is pushed by the spring 51 so as to engage the linkage 26 to retain it in lowered position.

In practice, therefore, when the stopper moves downwards, by virtue of the downward oscillation of the linkage 26 the cam-shaped wedge becomes interposed above the linkage 26, retaining it in lowered position.

The cam-shaped wedge 50 is provided, at its pivoting region, with a lug 52 that can be engaged by a flap 53 which allows to return the cam-shaped wedge to the initial position when it is necessary to dispense another espresso coffee.

Conventional coffee dispensing spouts, designated by the reference numeral 60, are provided downstream of the region where the stopper valve 20 acts.

In practical operation, first of all pressurized water is introduced through the feed channel 11, achieving imbibition of the various granules of the tablet with water and achieving an initial production of extracted liquid that contains the solid particles which protrude from the perforated bottom of the container 4 and enter the gap 40.

The initial flow-rate is in practice reduced to zero and substantially depends on the grinding size.

During this step, the imbibition of the granules continues and the pressure inside the coffee powder tablet continues to increase, since the stopper valve is closed by the removable plug constituted by the solid particles that accumulate in the gap 40.

The water then enters all the interstices of the coffee tablet, even the remotest and most labyrinthine ones; when the removal pressure is reached, the dispenser valve opens, and espresso coffee dispensing begins, with a simultaneous reduction of the pressure in the coffee powder tablet.

With a constant flow-rate value, the resulting water speed around the coffee powder granule is inversely proportional to its grinding size. If the grinding is coarse, the water finds large passages between the granules, where the water speed would be too low to be able to affect, by inertia and by turbulence, the surfaces located in dead regions that constitute the vast majority of the surface of the granules which compose a coffee tablet having a certain thickness.

Therefore, in order to achieve optimum utilization, the flow-rate must increase or decrease according to the size of the ground granules to allow a sufficient speed of the water flowing through.

In the specific case, this is achieved because the dispensing pressure downstream of the tablet is determined by the spring acting on the stopper. Therefore, as the flow-rate determined by the grinding size increases or decreases, downstream of the tablet there is a consequent increase or a relative decrease in pressure, which affects the stopper valve, tending to open or close it and allowing an increase or decrease in flow-rate that is necessary in order to maintain an adapted speed for the flow of water through the passages in the coffee tablet.

The increase in flow speed can be further enhanced to the detriment of the pressure by interposing the cam-shaped wedge upon the return of the stopper valve, which has opened beyond its dynamic equilibrium position due to the expulsion of the plug of solid particles as indicated above.

In practice, therefore, when the removal pressure is reached, allowing to expel the removable plug, a dispensing pressure is produced downstream of the coffee powder tablet that is lower than the removal pressure, so that inside the coffee powder tablet, after the initial step for the pressurization of the hot water, a depressurization step further occurs which facilitates the extraction of the substances contained in the coffee.

After dispensing the coffee, it is sufficient to remove the used tablet and replace it with another one, resetting the cam-shaped wedge, if provided.

From the above description it is thus evident that the invention achieves the intended aim and objects, and in particular the fact is stressed that this process allows to achieve extraction of most of the useful substances from the inside and from the outside of the coffee granules that constitute the powder tablet. This is achieved because the water penetrates deeply into the granules and solubilizes the desired substances, then flows out of said granules and maintains a certain flow speed around said granule to remove and convey all the substances contained internally and externally.

It is evident that the penetration of the water inside the microporosities of the granule will be achieved by pressurization, whereas its outward flow will be achieved during the depressurization step and the removal of the obtained solution occurs by virtue of an adapted flow speed.

With the device according to the invention it is therefore possible to obtain an espresso coffee of unusual quality, achieved by virtue of the optimum utilization of the precious substances contained in the coffee powder in their entirety.

Another advantage is constituted by the fact that at the end of the dispensing action, the coffee tablet remains substantially at atmospheric pressure, and therefore any residual liquid contained therein is automatically released.

The invention thus conceived is susceptible of numerous modifications and variations, all of which are within the scope of the inventive concept.

All the details may furthermore be replaced with other technically equivalent elements.

In practice, the materials employed, as well as the contingent shapes and dimensions, may be any according to the requirements.

What is claimed is:

1. A method of preparing a beverage comprising the steps of:
   a. feeding pressurized hot water through a coffee powder tablet to produce a liquid coffee extract;
   b. forming a removable plug from the liquid coffee extract wherein said removable plug prevents the flow of the liquid extract and increases the pressure downstream of the coffee powder tablet which results in a increase in the pressure of the hot water in the coffee power tablet;
   c. maintaining the removable plug until a removal pressure is reached that is sufficient to create a gap for the removal of the plug;
   d. dispensing the liquid extract at a pressure lower than the removal pressure, wherein at the end of the dispensing, the coffee tablet remains at about atmospheric pressure;
   e. extracting the beverage from the coffee powder tablet in an opening in a discharge passage; and
   f. maintaining the opening in the discharge passage until the pressure inside the coffee powder tablet has been completely relieved and the beverage has been completely extracted from the coffee powder tablet.

2. The method of claim 1 wherein the coffee powder tablet comprises coffee granules having a grinding size.

3. The method of claim 1 wherein the removable plug is formed by solid particles that are entrained from the liquid extract and the particles are accumulated downstream of the coffee powder tablet in a region used for preventing the flow of the liquid extract.

4. The method of claim 3 wherein the liquid extract is prevented from flowing by a stopper valve, the stopper valve comprising a stopper.

5. The method of claim 4 wherein the stopper has a conical stem having an apex angle and a stroke for producing the gap that creates a passage for removing the removable plug.

6. The method of claim 1 wherein the pressure of the hot water inside the coffee powder tablet is sufficient to fully imbibe the coffee granules and the liquid extract has an outward flow speed that is determined by a depressurization produced by the opening of the stopper valve.

7. The method of claim 5 wherein the water around the coffee granules has a resulting speed that is inversely proportional to the grinding size of the granules.

8. The method of claim 1 wherein the opening in the discharge passage is maintained by a locking means.

* * * * *